(12) United States Patent
Porat et al.

(10) Patent No.: US 10,299,095 B2
(45) Date of Patent: May 21, 2019

(54) WIRELESS LOAD MODULATION

(71) Applicant: INTEL CORPORATION, Santa Clara, CA (US)

(72) Inventors: Shahar Porat, Geva Carmel (IL); Sreenivas Kasturi, Hillsboro, OR (US); Siva Ramakrishnan, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 488 days.

(21) Appl. No.: 14/965,220

(22) Filed: Dec. 10, 2015

(65) Prior Publication Data

US 2016/0094054 A1    Mar. 31, 2016

Related U.S. Application Data

(63) Continuation of application No. 14/495,776, filed on Sep. 24, 2014, now abandoned.
(Continued)

(51) Int. Cl.
*H04W 4/80*   (2018.01)
*H02J 7/02*   (2016.01)
(Continued)

(52) U.S. Cl.
CPC .............. *H04W 4/80* (2018.02); *H02J 7/025* (2013.01); *H02J 50/12* (2016.02); *H02J 50/80* (2016.02); *H02J 50/90* (2016.02)

(58) Field of Classification Search
CPC .. H02J 7/025; H02J 50/90; H02J 50/80; H02J 50/12; H04W 4/008
See application file for complete search history.

(56) References Cited

U.S. PATENT DOCUMENTS

| | | | |
|---|---|---|---|
| 6,301,138 B1 | 10/2001 | Amtmann | |
| 8,872,386 B2 * | 10/2014 | Mach | H02J 5/00 307/104 |

(Continued)

FOREIGN PATENT DOCUMENTS

| | | |
|---|---|---|
| CN | 101272063 A | 9/2008 |
| CN | 101931250 A | 12/2010 |

(Continued)

OTHER PUBLICATIONS

Taiwan IPO Search Report, Taiwan Invention Patent Application No. 104100080, dated of completion Mar. 25, 2016, 2 pages.

(Continued)

*Primary Examiner* — Alfonso Perez Borroto
*Assistant Examiner* — Esayas G Yeshaw
(74) *Attorney, Agent, or Firm* — International IP Law Group, P.L.L.C.

(57) ABSTRACT

Techniques of load modulation are described herein. A wireless power transmitting unit may include a resonator to periodically transmit a short beacon having a first time period. The wireless power transmitting unit also includes circuitry coupled to the resonator. The circuitry is configured to detect a load change in the resonator when transmitting the short beacon and cause the resonator to transmit a long beacon subsequent to said transmitting the short beacon if said load change is detected. The long beacon has a second time period longer than the first time period.

14 Claims, 5 Drawing Sheets

Related U.S. Application Data

(60) Provisional application No. 61/937,881, filed on Feb. 10, 2014.

(51) Int. Cl.
*H02J 50/90* (2016.01)
*H02J 50/12* (2016.01)
*H02J 50/80* (2016.01)

(56) References Cited

U.S. PATENT DOCUMENTS

| | | | |
|---|---|---|---|
| 9,006,935 B2* | 4/2015 | Fukushima | H02J 5/005 307/104 |
| 9,106,096 B2* | 8/2015 | Kato | H02J 7/025 |
| 2008/0174267 A1 | 7/2008 | Onishi et al. | |
| 2008/0237346 A1 | 10/2008 | Savry et al. | |
| 2009/0079268 A1* | 3/2009 | Cook | H01Q 1/248 307/104 |
| 2011/0215158 A1 | 9/2011 | Kargl et al. | |
| 2011/0292991 A1 | 12/2011 | Muramatsu | |
| 2012/0038317 A1 | 2/2012 | Miyamoto et al. | |
| 2012/0123227 A1 | 5/2012 | Sun et al. | |
| 2012/0223589 A1* | 9/2012 | Low | H04B 5/0037 307/104 |
| 2012/0243433 A1* | 9/2012 | Kneckt | H04W 48/16 370/252 |
| 2012/0280575 A1* | 11/2012 | Kim | H02J 17/00 307/104 |
| 2013/0029595 A1 | 1/2013 | Widmer et al. | |
| 2013/0077349 A1* | 3/2013 | Jin | H02M 7/04 363/15 |
| 2013/0162051 A1 | 6/2013 | Michihata et al. | |
| 2013/0181665 A1 | 7/2013 | Lee et al. | |
| 2013/0293028 A1 | 11/2013 | Byun et al. | |
| 2013/0300204 A1 | 11/2013 | Partovi | |
| 2014/0049422 A1 | 2/2014 | Von Novak et al. | |
| 2014/0113689 A1* | 4/2014 | Lee | H01M 10/44 455/573 |
| 2014/0265614 A1 | 9/2014 | Kim et al. | |
| 2015/0163828 A1* | 6/2015 | Vandwalle | H04W 52/383 370/330 |
| 2015/0229135 A1 | 8/2015 | Porat et al. | |
| 2015/0233987 A1* | 8/2015 | Von Novak, III | G01R 27/08 324/701 |
| 2015/0243432 A1 | 8/2015 | Laifenfeld | |
| 2015/0333801 A1 | 11/2015 | Hosotani | |
| 2015/0380988 A1* | 12/2015 | Chappell | H02J 17/00 307/104 |
| 2016/0094050 A1* | 3/2016 | Shichino | H02J 17/00 307/104 |
| 2016/0114686 A1* | 4/2016 | Beattie, Jr. | B60L 11/182 320/108 |
| 2016/0149415 A1* | 5/2016 | Ijichi | H02J 3/32 307/66 |
| 2016/0303980 A1* | 10/2016 | Cyr | B60L 11/182 |

FOREIGN PATENT DOCUMENTS

| | | |
|---|---|---|
| CN | 102239619 A | 11/2011 |
| CN | 202524172 U | 11/2012 |
| CN | 104205549 A | 12/2014 |
| DE | 102011084485 A1 | 4/2013 |
| EP | 1022840 A2 | 7/2000 |
| JP | 2008236916 A | 2/2008 |
| JP | 2008178195 A | 7/2008 |
| JP | 2011030404 A | 10/2011 |
| JP | 2013212004 A | 10/2013 |
| JP | 2016504007 A | 2/2016 |
| TW | 201117510 A | 5/2011 |
| TW | 201145747 A | 12/2011 |
| TW | M417716 U | 12/2011 |
| TW | 201304346 A | 1/2013 |
| TW | 201347346 A | 11/2013 |
| TW | 201347349 A | 11/2013 |
| TW | 201351836 A | 12/2013 |
| WO | 2013086363 A2 | 6/2013 |
| WO | 2013151831 A1 | 10/2013 |
| WO | 2014093160 A1 | 6/2014 |
| WO | 2015009328 A1 | 1/2015 |

OTHER PUBLICATIONS

Taiwan IPO Search Report, TW Application No. 105120565, date of completion Mar. 27, 2017, 2 pages.
Sengupta et al., "How to implement a 5W Wireless Power System", How2Power, Jul. 2010, USA, 8 pages.
Texas Instruments, bq51013A,13q51014, "Integrated Wireless Power Supply Receiver, Qi (Wireless Power Consortium) Compliant", Oct. 2013, http://www.ti.com/lit/ds/symlink/bq51013a.pdf, retrieved on Jul. 9, 2017, USA, 45 pages.
Texas Instruments, bq500210 "Qi Compliant Wireless Power Transmitter Manager", Sep. 2012, http://www.ti.com/lit/ds/symlink/bq500210.pdf, retrieved on Jul. 9, 2017, USA, 24 pages.
Texas Instruments, CC2540F128, CC2540F256 "2.4-GHz Bluetooth low energy System-on-Chip", Jun. 2013, http://www.ti.com/lit/ds/symlink/cc2540.pdf, retrieved on Jul. 9, 2017, USA, 86 pages.
Tseng et al., "Introduction to the Alliance for Wireless Power Loosely-Coupled Wireless Power Transfer System Specification Version 1.0", Wireless Power Transfer (WPT), 2013 IEEE, Date of Conference: May 16-16, 2013, Conference Location: Perugia, Italy, Date Added to IEEE Xplore: Jul. 15, 2013, http://ieeexploraieee.org/stamp/stamp.isp?arnumber=6556887, retrieved on Jul. 9, 2017, USA, 6 pages.
Wireless Power Consortium, "System Description Wireless Power Transfer Volume I: Low Power Part 1: Interface Definition Version 1.0.1", Oct. 2010, http://www.y-adagio.com/public/committees/iec_tc100_ags/meetings/29/100ags438.pdf, retrieved on Jul. 9, 2017, USA, 86 pages.

* cited by examiner

400

WIRELESS LOAD MODULATION

CROSS REFERENCE TO RELATED APPLICATIONS

The present application is a continuation of U.S. application Ser. No. 14/495,776 filed Sep. 24, 2014 which claims priority to U.S. Provisional Patent Application No. 61/937,881, filed Feb. 10, 2014, both of which are incorporated herein by reference.

TECHNICAL FIELD

This disclosure relates generally to techniques for wireless charging. Specifically, this disclosure relates to load modulation during initialization phases of wireless charging.

BACKGROUND ART

A basic wireless charging system may include a wireless power transmitter unit (PTU) and a wireless power receiving unit (PRU). For example, a PTU may include a transmit (Tx) coil, and a PRU may include receive (Rx) coil. Magnetic resonance wireless charging may employ a magnetic coupling between the Tx coil and the Rx coil. A common issue seen in these types of wireless charging systems is during an initialization phase. In an initialization phase, the PTU attempts to detect whether a valid PRU is being placed on or near the Tx coil of the PTU. For example, the PTU may be configured to sense load variations during a first predetermined beacon period indicated a device is on, or near the Tx coil. The load variations may be caused by a PRU being placed on or near the PTU, but may also be caused by a conductive metal of an object, such as a coin, or a device having a non-valid receiving coil in terms of a wireless charging protocol of the PTU.

For example, a PTU may power on during the first predetermined beacon period to detect whether a load associated with inductive coupling of the Tx coil by an object has changed. If a change in load is sensed, e.g., compared to the previous period, the PTU will power on for a second predetermined beacon period that is relatively longer than the first predetermined beacon period. For example, the first predetermined beacon period may be 30 milliseconds. The first predetermined beacon period may be relatively short in comparison to a longer second beacon period of 100 milliseconds configured to follow the short beacon. If the object causing the load change is not a valid device, the power transmitted by inductive coupling to the non-valid device during the long beacon may damage the non-valid device. Further, if the device to be charged has little or no charge, the device may not be able to load power charging operations, such as wireless data transmission related to the wireless charging operations.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE ASPECTS

The present disclosure relates generally to techniques for performing load modulation at a power receiving unit (PRU). As discussed above, magnetic resonance wireless charging systems may employ a magnetic coupling between a power transmitting unit (PTU) having a transmit (Tx) coil, and a PRU having a receive (Rx) coil. However, in order to save power, the PTU may power off when the PTU is not coupled to a PRU. The PTU may only power on during predetermined periods of time in order to sense any change in a load indicating a PRU has potentially been placed on, or near the PRU for charging. The predetermined periods of time may be referred to herein as beacons. During an initialization phase, the PTU needs to detect if a valid PRU is exists, and only then transmit energy to charge a device having the valid PRU. As discussed above, if the PTU attempts to charge a non-valid device, it may cause damage to the non-valid device.

A valid device is a device having a PRU meeting a power charging protocol of the PTU. A power charging protocol may be a protocol associated with a standards organization such as the specification provided by Alliance For Wireless Power (A4WP) version 1.2.1, May 7, 2014. A non-valid device is a device that does not have a PRU meeting a power charging profile of a charging protocol associated with the PTU. A non-valid device may also include a conductive object, such as a coin, a key, a remote control, and the like, having a conductive material that may be unintentionally coupled to the PTU during a beacon period.

The techniques described herein include a method for performing load modulation at an Rx coil of a PRU. The load modulation may prevent unnecessary charging, or power transmission, by the PTU to non-valid devices or objects. As discussed above, during a short beacon, a PTU may sense an initial load change due to coupling of the Tx coil with a potential Rx coil of a PRU. Subsequent to the short beacon, the PTU may power on during a long beacon. During the long beacon, the PRU may modulate the load received at the Rx coil such that the PTU may detect the load modulation indicating that a valid PRU is coupled to the PTU.

Figure 1:
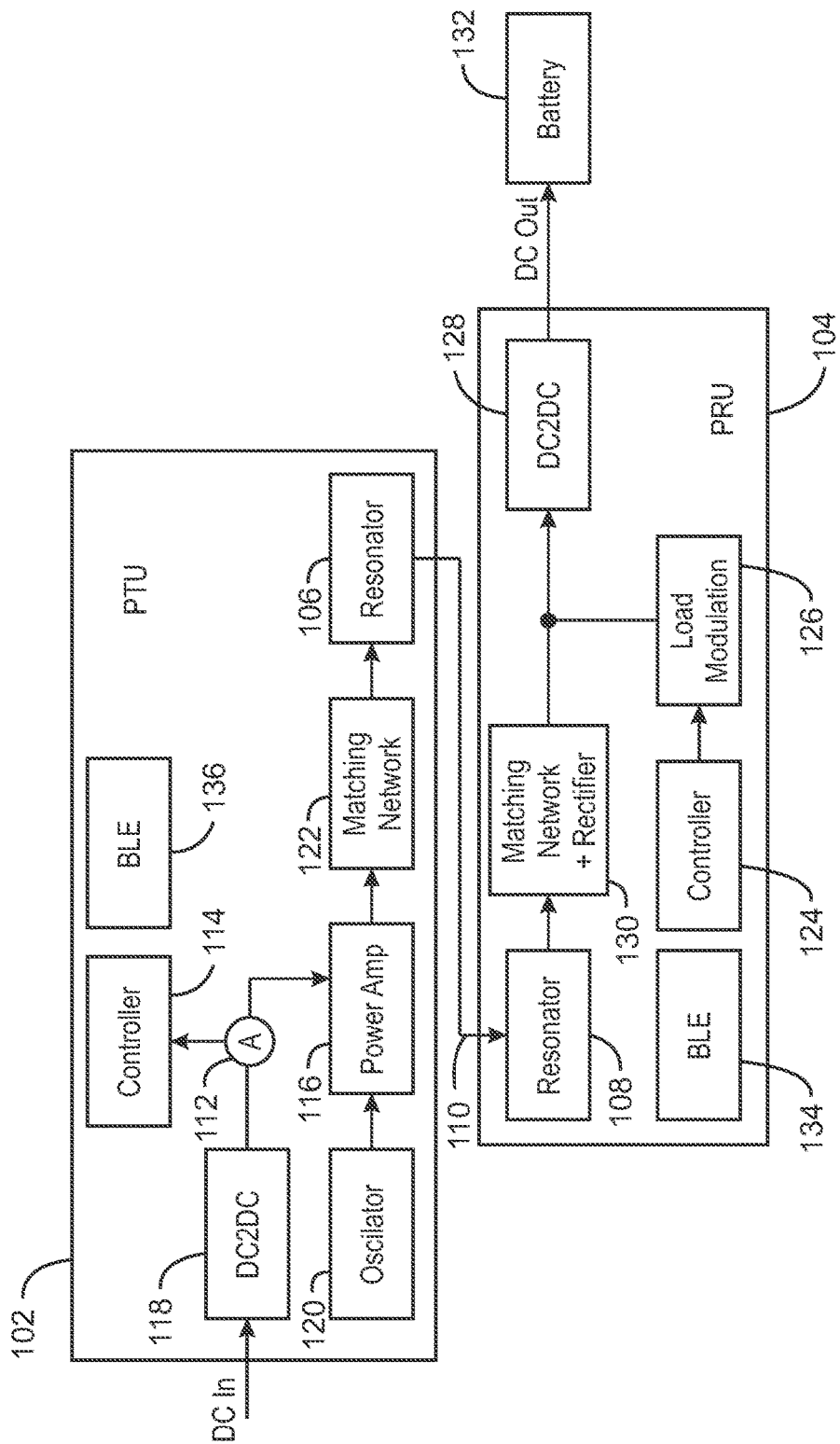
FIG. 1 is block diagram of a PTU having a sensing mechanism to sense load variation in PRU.

FIG. 1 is block diagram of a PTU having a sensing mechanism to sense load variation in PRU. The PTU 102 may be coupled to a PRU 104 via magnetic inductive coupling between resonators 106, 108, as indicated by the arrow 110. The resonator 106 may be referred to herein as a Tx coil 106 of the PTU 102. The resonator 108 may be referred to herein as an Rx coil 108 of the PRU 104.

As discussed above, the PRU 104 may perform load modulation to signal presence to the PTU 102. During an initialization phase, the PTU 102 may issue a short beacon. For example, the short beacon has a duration of 30 milliseconds. Upon issuing the short beacon, the Tx coil 106 inductively couples to the Rx coil 108. The inductive coupling may cause an initial load change detected by a current sensor 112 of the PTU 102. The current sensor 112 may be an ampere meter, a volt meter, or any other meter configured to sense load variations occurring due to inductive coupling between the PTU 102 and another object, such as the PRU 104. The current sensor 112 may provide an indication of load change to a controller 114 of the PTU 102. Upon detecting a load change during the short beacon, the controller 114 may power on a power amplifier 116 configured to receive direct current (DC) from a direct current (DC2DC) converter 118, and to amplify and oscillate the current. An oscillator 120 may oscillate the power provided at a given frequency and a matching network 122 may be used to match the amplified oscillation provided to the resonator 106 of the PTU 102 based on a wireless power protocol standard, and also at a resonating frequency associated with the PRU 104. The PTU 102 may issue a long beacon after receiving an indication of the initial load change from the PRU 104, e.g., via the current sensor 112. In some scenarios, the long beacon has a duration of 95 milliseconds up to 3 seconds.

The PRU 104 may include a controller 124 configured to detect current received at the Rx coil 108 resulting from an inductive coupling between the Tx coil 106 and the Rx coil 108. After detecting an inductive coupling during the short beacon, the controller 124 may modulate a load associated with the current received at the Rx coil 108 during the long beacon issued by the PTU 102. In some examples, the load modulation may be performed by the load modulation circuitry 126, discussed in more detail below. In other examples, the load modulation may be performed at a direct current to direct current (DC2DC) converter 128 of the PRU 104. The DC2DC converter 128 is an electronic circuit configured to convert a direct current (DC) from one voltage level to another after receiving the voltage from a matching network rectifier 130. As illustrated in FIG. 1, the DC2DC converter 128 provides a DC output to a battery 132, or another current/power consuming component. The DC2DC converter 128 may convert DC received as a result of the inductive coupling of the Tx coil 106 and the Rx coil 108. In order to perform modulation, the controller 124 may direct the DC2DC converter 128 to vary the conversion such that a load is modulated and detectable by the PTU 102. In other examples, the controller 124 may turn the DC2DC converter 128 on and off, resulting in a load modulation detectable at the PTU 102. In this example, by turning off the DC2DC converter 128, the modulated load is achieved by a lower load than the normal load observed when the DC2DC converter is running normally.

In some examples, the load modulation is achieved by activating a shunt resistor, discussed in more detail below. In this scenario, the modulated load is higher than the normal load. In a further variant, the DC2DC converter 128 can be operated in a power inefficient way, e.g., by switching its internal components more often than necessary, thus causing losses due to switching, or deliberately causing short periods of so called shoot-through currents, thereby presenting a higher load at the RX coil and subsequently to the TX coil via then inductive coupling 110. In order to enable a flexible implementation at the PRU 104, the PTU 102 may be able to detect both kinds of load modulations—i.e., increased and decreased load. The PTU 102 may only consider the magnitude of load modulation differences, not the polarity, thus being able to uniformly handle different implementations of PRUs. As there are typically more PTUs than PRUs and because PRUs typically experience tighter constrains regarding size, weight and cost, giving some more flexibility to the PRU design may be beneficial.

A wireless data transmission component 134 of the PRU 104 may transmit wireless data to a wireless data transmission component 136 of the PTU 102. In examples, the wireless data transmission is a Bluetooth low energy (BLE) data transmission. The BLE transmission may include an advertisement to the PTU 102 indicating that the PRU 104 is a valid PRU. In some examples, the battery 132 may not have enough energy to support a wireless data transmission operation via a BLE advertisement. However, as long as the PRU 104 modulates load, the PTU 102 will continue to power on the power amplifier 116 during the long beacon. Further, the PTU 102 may be configured to continue to run the power amplifier 116 to a maximum time, such as 3 seconds for example, to enable the battery 132 to receive sufficient charge to load a wireless data transmission operation, or to drive the wireless data transmission operation directly—i.e., without having to rely on power from the battery 132. In some scenarios, the PTU 102 is configured to repeat the long beacon power-on state until a wireless data advertisement is received. The PTU 102 may continue to issue long beacons without danger of transmission to an invalid PRU because the load modulation identifies to some extent whether the PRU is a valid PRU, such as the PRU 104.

In some aspects, the load modulation may reflect a binary communication. For example, the load modulation performed by the PRU 104 may sequenced in a way to provide a signal of 1 0 1 0, e.g., by the sequence of providing, non-providing, providing, non-providing, and the like, a load modulation where the sequence presents the binary information 1 0 1 0. Other information may be provided similarly. In this scenario, the wireless data transmission is communicated via a specific sequence of load modulation. The controller 114, upon identifying the sequence, may determine or acknowledge the device type of the PRU 104, and determine or acknowledge that the PRU 104 is a valid device. In some aspects, the binary sequence of the load modulation may be configured to match a binary data signal transmitted by the wireless data transmission component 134, or vice versa. By providing matched binary indications to the PTU 102, the PTU 102 may avoid wireless data coupling to a device that is not placed on the PTU 102. For example, if the PTU 102 is next to another PTU having a device including a valid PRU placed on the other PTU, the PTU 102 may mistakenly communicatively couple to the device even when the device is not placed on the PTU 102. However, the PTU 102 may reject wireless data coupling to devices that have not previously, or subsequently, provided a binary sequence to the PTU 102 through load modulation. Because the sequence provided via load modulation does not have to be available immediately at the PTU 102, the sequence may be sent at a later time, e.g., during the long beacon, as opposed to a sequence sent right at the first instance of load modulation. The comparison with the sequence conveyed via the wireless interface can be done at the PTU 102, the PRU 104, or both.

Figure 2:
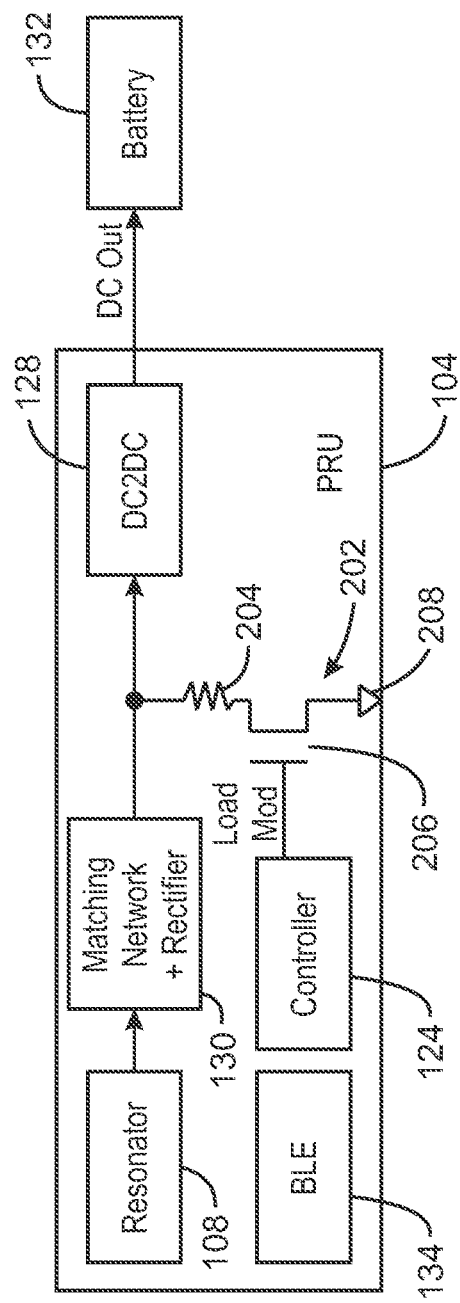
FIG. 2 is a block diagram of the PRU having an example load modulation mechanism.

FIG. 2 is a block diagram of the PRU having an example load modulation circuitry. The load modulation mechanism 202 illustrated in FIG. 2 may be one example of the load modulation circuitry 126. However, as discussed above, load modulation may be performed without load modulation circuitry. For example, load modulation may be implemented as operations of the controller 124 to direct the DC2DC converter 128 to modulate the load.

The example of load modulation circuitry 202 illustrated in FIG. 2 includes a resistor 204 and a switch 206. The switch 206 may be electrically coupled to the controller 124. When the controller 124 detects a short beacon followed by a long beacon, the controller 124 may open or close the switch 206 such that more or less current flows across the resistor towards ground 208. For example, the switch 206 may be a transistor. In this scenario, the controller 124 may increase or decrease a bias voltage of the transistor such that current flowing across the resistor 204 is modulated.

Although not illustrated in FIG. 2, a load variation may be implemented at the output of the DC2DC converter 128. In this scenario, a shunt resistor may be coupled in between the DC2DC converter 128 and the battery 132. A resistor and a switch, such as the resistor 204 and the switch 206 may be alternatively coupled to the output of the DC2DC converter 128. Other implementations may be applicable wherein various components are used in the load modulation discussed herein.

Figure 3:
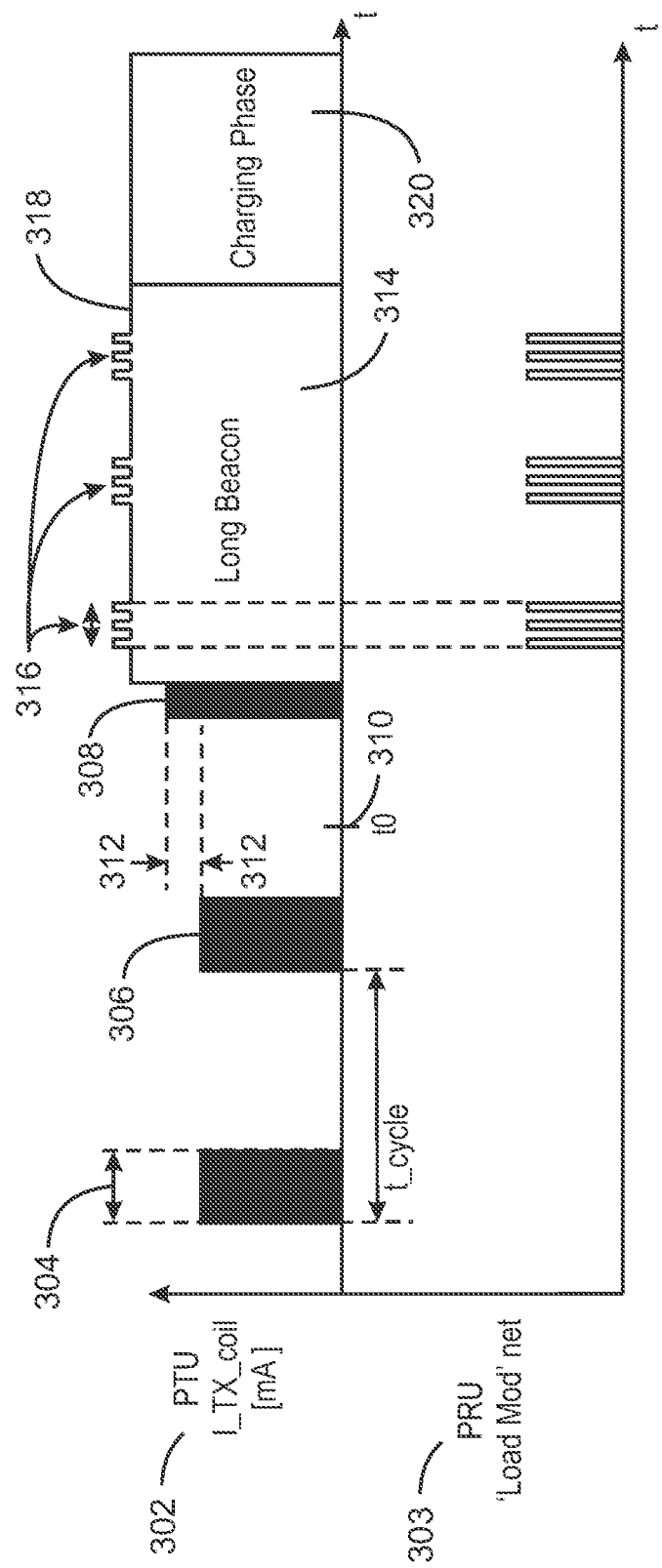
FIG. 3 is a graph illustrating load modulations used to communicate presence of a valid PRU.

FIG. 3 is a graph illustrating load modulations used to communicate presence of a valid PRU. The graph 300 includes a top portion 302 indicating a current, or observed load, at the Tx coil 106 of the PTU 102, and a bottom portion 303 indicating load modulation at the PRU 104. During a short beacon, indicated at 304, 306, 308, current may increase due to a conductive object being placed on, or near the PTU 102 at time "t0" indicated at 310. The resulting increase in current creates a load change, as indicated at 312.

During the long beacon 314, the PRU will modulate the load such that the PTU can detect the load modulations, as indicated at 316. Before the long beacon 314 is complete, the PRU may transmit a wireless data signal, as indicated at 318. The wireless data signal may be a BLE advertisement discussed above in reference to FIG. 1 and FIG. 2, before entering a charging phase, as indicated at 320. The PTU may enter the charging phase 320 in response to receiving the BLE advertisement.

Although not indicated in FIG. 3, load modulation 316 may be performed during a short beacon, such as during one or more of the short beacons 304, 306, 308. In this scenario, although the power transmitted during the long beacon 314 may be relatively small in comparison to the power transmitted during the charging phase 320, the load modulation may be presented during an even smaller interval, such as during a short beacon 304, 306, and/or 308. This may prevent decrease the time it takes to begin a charging phase by performing load modulation during a short beacon. Further, if the PTU has enough battery to broadcast a BLE advertisement, such as the wireless data signal 318, it may do so after receiving a load modulation during one or more of the short beacons, rather than waiting for the long beacon 314.

Figure 4:
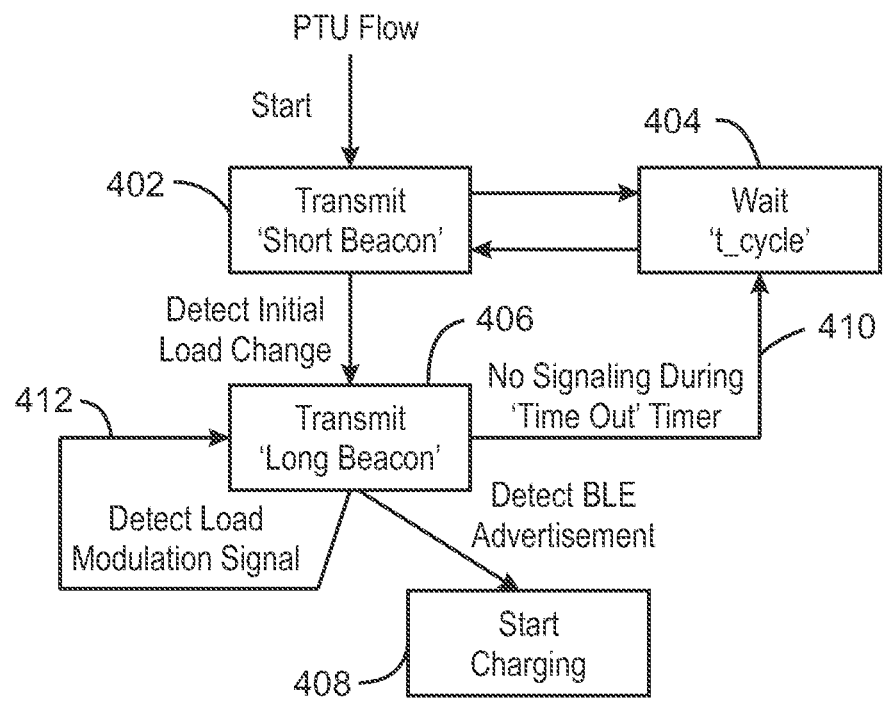
FIG. 4 is a flow diagram of a PTU receiving load modulation.

FIG. 4 is a flow diagram of a PTU receiving load modulation. The PTU may be the PTU 102 of FIG. 1. The PTU 102 may transmit a short beacon at 402 and wait a 't_cycle' period as indicated by 404. The t_cycle period is a time period between two short beacons. During the short beacon 402, the PTU 102 may detect a load change. If a load change is detected during the short beacon 402, the long beacon is transmitted, as indicated at 406. If a load modulation signal is detected during the long beacon 406, then the long beacon will be extended. If a wireless data transmission is then received, the PTU 102 will start charging at 408. As indicated at 410, if no wireless data transmission is received, the PTU 102 may return to the wait cycle 404 for a period of 't_cycle'. However, if the PTU 102 continues to detect a load modulation signal at 412, the long beacon may continue to transmit, or be retransmitted, enabling a device having no charge to receive sufficient power to send the wireless data transmission and begin charging at 408.

Figure 5:
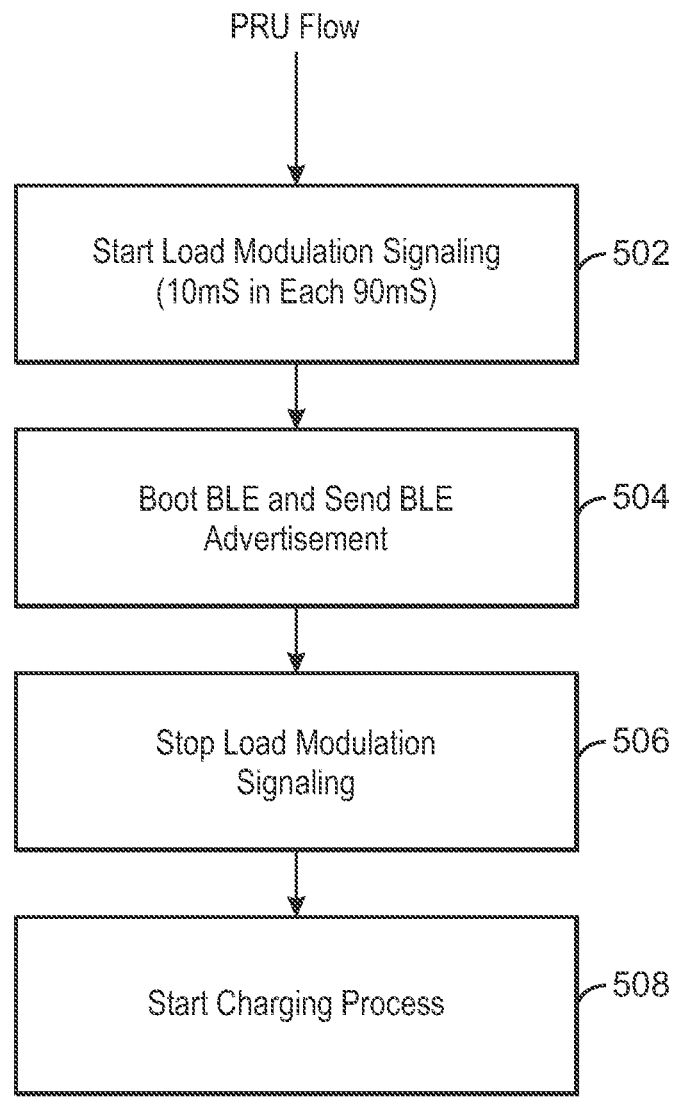
FIG. 5 is a flow diagram of a PRU performing load modulation.

FIG. 5 is a flow diagram of a PRU performing load modulation. The PRU may be the PRU 104 configured to inductively couple to a PTU 102 of FIG. 1. At 502, load modulation may be performed after receiving an indication of a short beacon from the PTU 102. The load modulation at the PRU 104 may be performed using charge provided by the PTU 102 during the short beacon, or using the charge provided by the PTU 102 during the long beacon. At 504, wireless data transmission operations are booted and wireless data transmissions, such as a BLE advertisement is transmitted. At 506, the PRU 104 will discontinue load modulation signaling, and at 508, the PRU 102 will be in a charging process to receive charge from the PTU 102.

Example 1 includes a wireless power receiving unit. The wireless power receiving unit includes a receiving coil to receive a short beacon having a first time period, and a long beacon having a second time period longer than the first time period. The wireless power receiving unit further includes a controller of the wireless power receiving unit to initiate load modulation during the long beacon at the receiving coil. The controller is to continue to perform the load modulation during the long beacon until sufficient power is received at the wireless power receiving unit to initiate a wireless data transmission during the long beacon.

The time period of the long beacon has a time minimum and a time maximum. The long beacon persists to the maximum time as long as the load modulation persists. In some cases, the wireless data transmission includes a sequence of load modulations indicating a binary sequence. The load modulation performed in a binary sequence may indicate a power charging profile of a device housing the receiving coil via the binary sequence, a device identification of a device housing the receiving coil via the binary sequence, or any combination thereof.

The wireless power receiving unit may also include a Bluetooth Low Energy (BLE) module. The wireless data transmission includes a BLE advertisement from the BLE module. The wireless power receiving unit may also include load modulation circuitry wherein the controller is to direct the load modulation circuitry to increase or decrease a load received at the wireless power receiving unit.

The wireless power receiving unit may also include a direct current to direct current (DC2DC) converter. In this case, the controller is to direct the DC2DC converter to modulate load based on modulating rates of direct current conversion.

In some cases, the short beacon and long beacon are generated at a power transmitting unit having a transmitting coil. Receiving the short beacon at the power receiving unit generates an initial load change at the power transmitting unit indicating the presence of the power receiving unit. Further, in some cases, the wireless data transmission indicates the power receiving unit is a valid power receiving unit according to a wireless transmission protocol associated with the power transmitting unit.

A load modulation may include an increase in load. A load modulation may also include a decrease in load. In some cases, load modulation may include a combination of an increase in load and a decrease in load.

Example 2 includes a method of load modulation in a wireless component. The method includes receiving a short beacon having a first time period at receiving coil from a transmitting coil, performing an initial load change at the receiving coil to indicate the presence of the receiving coil to the transmitting coil, and receiving a long beacon having a second time period longer than the first time period in response to the load modulation at the receiving coil. The method further includes performing a load modulation during the long beacon until sufficient power is received at the wireless power receiving unit to initiate a wireless data transmission during the long beacon.

The time period of the long beacon has a time minimum and a time maximum. The long beacon persists to the maximum time as long as the load modulation persists. In some cases, the wireless data transmission includes a sequence of load modulations indicating a binary sequence. The load modulation performed in a binary sequence may indicate a power charging profile of a device housing the receiving coil via the binary sequence, a device identification of a device housing the receiving coil via the binary sequence, or any combination thereof.

The method may also include transmitting a binary sequence of load modulation indicating a power charging profile of a device housing the receiving coil via the binary sequence, or transmitting a binary sequence of load modulation indicating a device identification of a device housing the receiving coil via the binary sequence, or any combination thereof.

The wireless power receiving unit may also include a Bluetooth Low Energy (BLE) module. The wireless data transmission includes a BLE advertisement from the BLE module. The method may include transmitting the BLE advertisement from a BLE module. The method may also include increasing or decreasing a load received at the wireless power receiving unit by load modulation circuitry.

In some cases, the method may include modulating rates of direct current conversion at direct current to direct current (DC2DC) converter. The short beacon and long beacon are generated at a power transmitting unit having a transmitting coil in some cases. The wireless data transmission may indicate the proper receiving unit is a valid power receiving unit according to a wireless transmission protocol associated with the power transmitting unit.

A load modulation may include an increase in load. A load modulation may also include a decrease in load. In some cases, load modulation may include a combination of an increase in load and a decrease in load.

Example 3 includes a wireless power transmitting unit. The wireless power transmitting unit includes a transmitting coil to transmit a short beacon having a first time period and a long beacon having a second time period relatively longer than the first time period. The wireless power transmitting unit may also include a means to detect an initial load change at upon generating a short beacon indicating a presence of a receiving coil, issue a long beacon to the receiving coil in response to the initial load change, and issue the long beacon as long as a load modulation is detected.

In some cases, the means may include a controller having logic, at least partially comprising hardware logic. In other cases, the means may include modules implemented by a computer processor. In yet other cases, the means may include a combination of logic and processor-executable modules.

Example 4 includes a means configured to carry out the method of Example 2. In some cases, the means may include a controller having logic, at least partially comprising hardware logic. In other cases, the means may include modules implemented by a computer processor. In yet other cases, the means may include a combination of logic and processor-executable modules.

Example 5 includes a wireless power system. The system may include a transmitting coil to issue a short beacon having a first time period, and a long beacon having a second time period longer than the first time period. The system may also include a receiving coil to receive the short beacon and the long beacon, and a controller of a wireless power receiving unit to initiate load modulation during the long beacon at the receiving coil. The controller is configured to continue to perform the load modulation during the long beacon until sufficient power is received at the wireless power receiving unit to initiate a wireless data transmission during the long beacon.

Example 6 includes an apparatus for wireless power. The apparatus includes a receiving coil to receive a short beacon having a first time period, and a long beacon having a second time period longer than the first time period. The apparatus may also include a means to initiate load modulation during the long beacon at the receiving coil. The means to initiate load modulation is to continue to perform the load modulation during the long beacon until sufficient power is received at the wireless power receiving unit to initiate a wireless data transmission during the long beacon.

In some cases, the means may include a controller having logic, at least partially comprising hardware logic. In other cases, the means may include modules implemented by a computer processor. In yet other cases, the means may include a combination of logic and processor-executable modules.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A wireless power transmitting unit, comprising:
   a resonator to periodically transmit a short beacon having a first time period;
   circuitry coupled to the resonator and configured to:
   detect a load change in the resonator when transmitting the short beacon; and
   cause the resonator to transmit a long beacon subsequent to said transmitting the short beacon if said load change is detected, the long beacon having a second time period longer than the first time period.

2. The wireless power transmitting unit of claim 1, wherein the first time period is to be less than 30 milliseconds and the second time period is to be at least 100 milliseconds.

3. The wireless power transmitting unit of claim 1, wherein the load change is to indicate a presence of a power receiving unit in a vicinity of the resonator.

4. The wireless power transmitting unit of claim 1, further comprising a controller coupled to the resonator to control the resonator.

5. The wireless power transmitting unit of claim 1, wherein the change in load is to be a comparison of a load determined in a current short beacon with a load determined in a previous short beacon.

6. A wireless power receiving unit, comprising
   a resonator to:
   periodically receive short beacons having a first time period; and
   receive a long beacon, subsequent to receiving at least one of the short beacons, if the power receiving unit is placed into a charging area of a wireless power transmitting unit, the long beacon having a second time period longer than the first time period.

7. The wireless power receiving unit of claim 6, wherein the first time period is to be less than 30 milliseconds and the second time period is to be at least 100 milliseconds.

8. The wireless power receiving unit of claim 6, further comprising a controller coupled to the resonator.

9. A first device for wirelessly charging a second device, comprising:
   means to periodically transmit, from a resonator, a series of short beacons having a first time period;
   means to detect a load change in the resonator during at least one of the short beacons; and
   means to transmit a long beacon from the resonator subsequent to said at least one of the short beacons, if said load change is detected, the long beacon having a second time period longer than the first time period.

10. The first device of claim 9, wherein the first time period is to be less than 30 milliseconds and the second time period is to be at least 100 milliseconds.

11. The first device of claim 9, wherein the load change is to indicate a presence of a power receiving unit in a vicinity of the resonator.

12. The first device of claim 9, wherein the load change is to be a comparison of a load detected in a current short beacon with a load detected in a previous short beacon.

13. A wireless power receiving unit for being wirelessly charged by a wireless power transmitting unit, comprising
   means to receive a series of short beacons having a first time period;
   means to receive a long beacon, subsequent to said receiving at least one of the short beacons, if the power receiving unit is placed into a charging area of a wireless power transmitting unit, the long beacon having a second time period longer than the first time period.

14. The wireless power receiving unit of claim 13, wherein the first time period is to be less than 30 milliseconds and the second time period is to be at least 100 milliseconds.

* * * * *